United States Patent [19]
Shoffner

[11] 3,797,861
[45] Mar. 19, 1974

[54] CHECK OUT SYSTEM AND CART THEREFOR

[76] Inventor: Willie M. Shoffner, 318 S. Lutheran Church Rd., New Lebanon, Ohio 45345

[22] Filed: Dec. 6, 1971

[21] Appl. No.: 204,929

Related U.S. Application Data
[62] Division of Ser. No. 62,889, Aug. 11, 1970, Pat. No. 3,700,074.

[52] U.S. Cl. .......................................... 280/33.99 H
[51] Int. Cl. ............................................... B62b 3/08
[58] Field of Search .................. 280/33.99 H, 33.99 F, 280/33.99 A, 33.99 R, 79.2; 186/1 AC

[56] References Cited
UNITED STATES PATENTS
2,727,750   12/1955   Noll ............................ 280/33.99 H
2,605,116   7/1952   Alexander ................... 280/33.99 H
3,081,791   4/1963   Shoffner ............................ 186/1 AC
3,480,114   11/1969   Shoffner ................... 280/33.99 F X Primary Examiner—Kenneth H. Betts
Assistant Examiner—Milton L. Smith
Attorney, Agent, or Firm—Melvin A. Crosby

[57] ABSTRACT

A merchandise check out system and a special cart in which the customer has collected the merchandise is presented to a check out station so that a check out clerk in the station can pick up the articles of merchandise from the cart directly, while a second cart in end to end relation with the first cart has bags therein into which the merchandise can be placed directly by the check out clerk, thereby eliminating the counters and conveyors. The basket of the cart is open at the front and is tiltable upwardly at the front end to selected angles.

5 Claims, 14 Drawing Figures

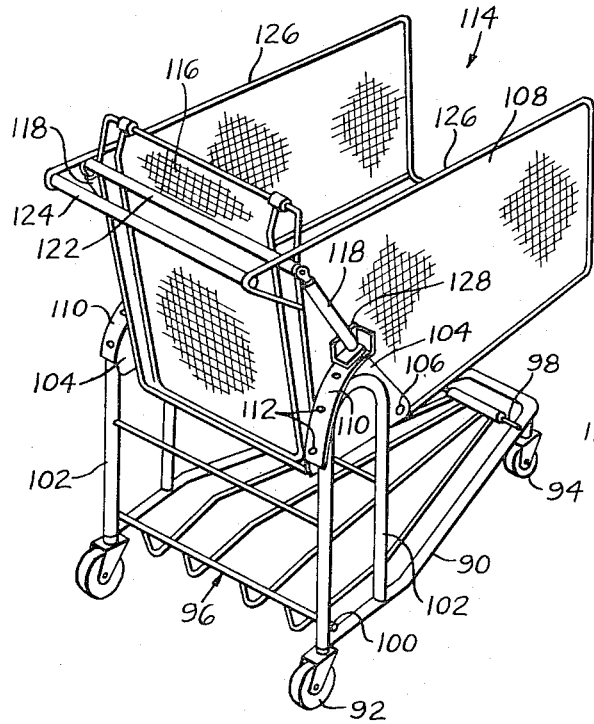
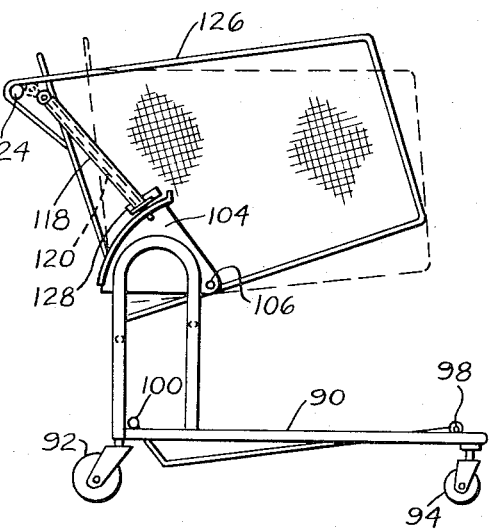
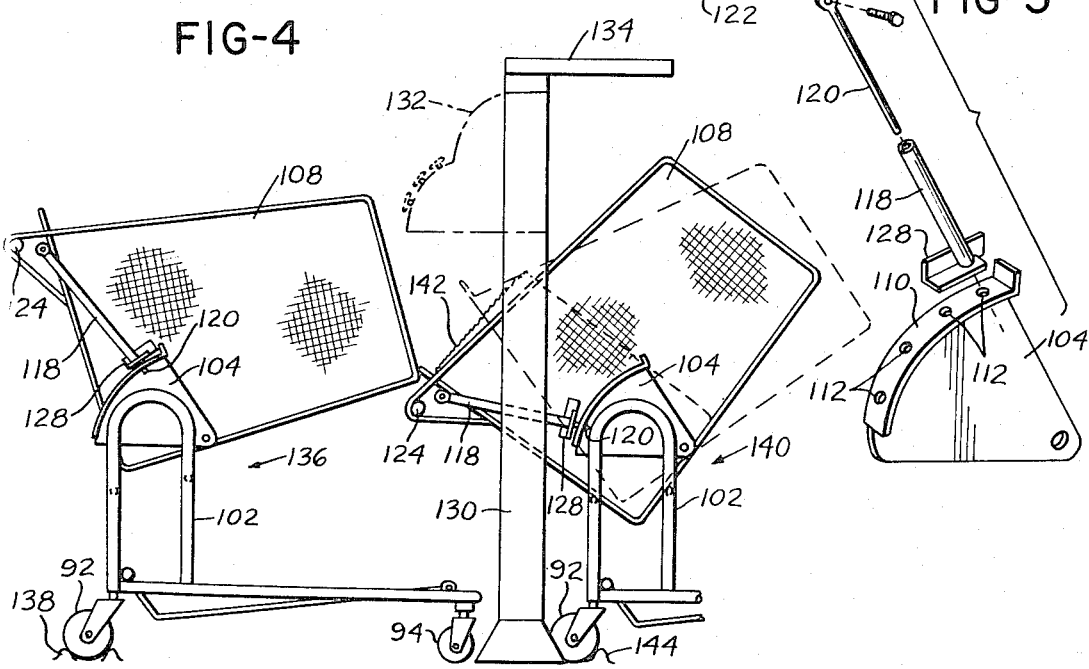

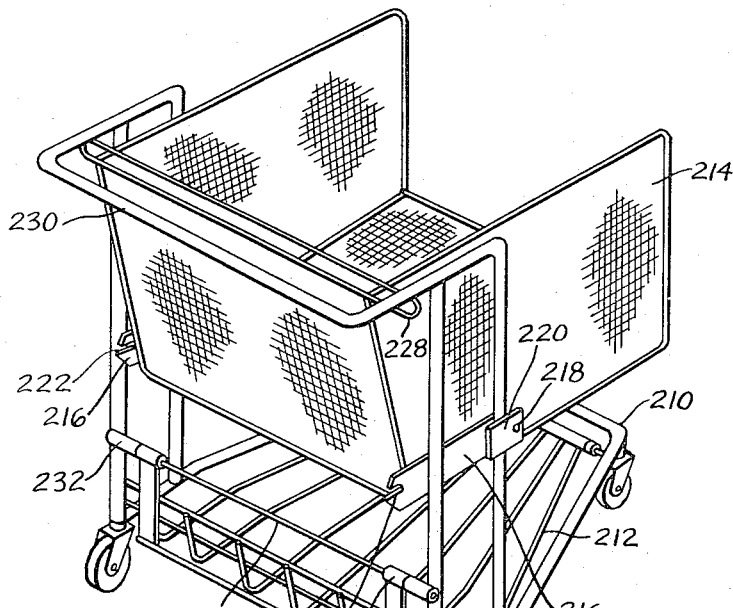
FIG-8
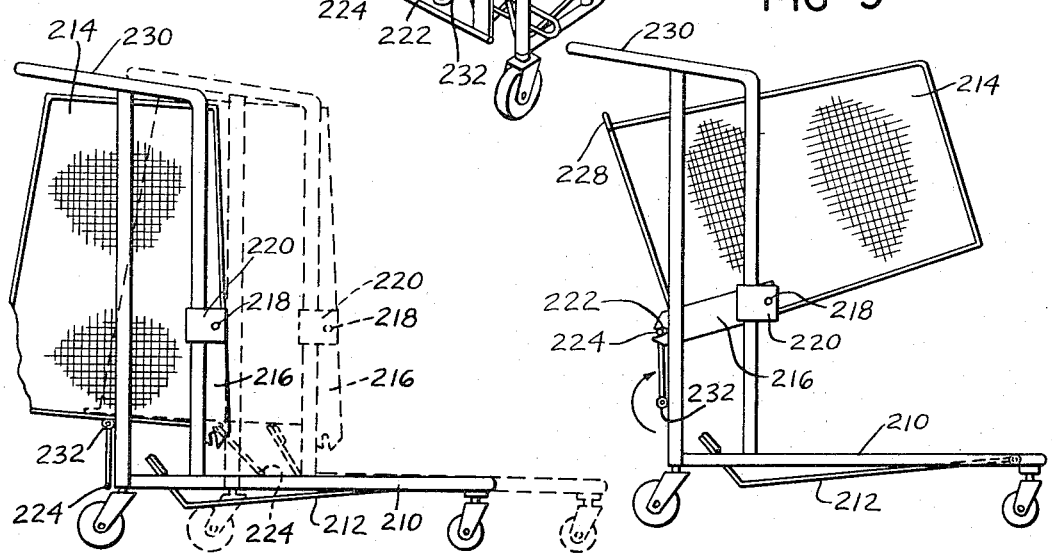
FIG-9
FIG-10
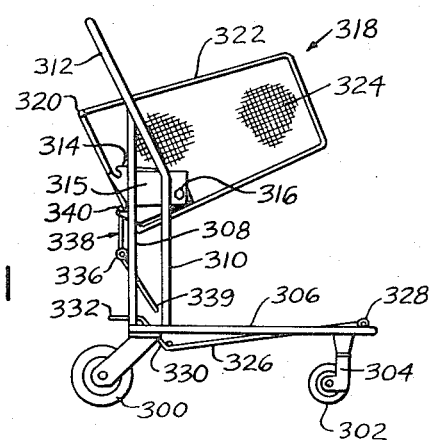
FIG-11

CHECK OUT SYSTEM AND CART THEREFOR

This invention relates to merchandise check out systems, and is particularly concerned with a cart for use with such systems. The present application is a division of my copending application, Ser. No. 62,889, filed Aug. 11, 1970, now U.S. Pat. No. 3,700,074 issued Oct. 24, 1972.

The conventional type retail outlet of substantial size operates by stocking merchandise on open shelves and merchandise carts are provided for the customers who take the carts through the store and place desired merchandise therein.

When the desired merchandise has been selected, the cart is taken to a check out clerk and transferred to a suitable container, or containers, such as one or more boxes or bags. The merchandise after being placed in the container, or containers, is then removed from the establishment, as by means of a further cart in which the containers can readily be conveyed to an automobile.

The check out station in such an establishment is usually rather large and the operation of checking out the merchandise is slow and laborious and time consuming. Ordinarily, the customer removes the merchandise from the merchandise cart and deposits it on a counter or conveyor and the check out clerk then checks out the merchandise item by item and inserts the sales price thereof in the cash register while advancing the merchandise item by item on the counter or conveyor.

After the merchandise order is completely deposited on the counter by the customer, and completely checked out by the check out clerk, it is transferred to containers, either by the check out clerk or by a further employee. The described operation involves the handling of the merchandise at the check out station first by the customer and then by the check out clerk and then again either by the check out clerk or by a further employee.

Attempts have been made to eliminate at least one handling operation during the checking out operation including arrangements where the merchandise cart either extends over the top of the check out counter or will pass therebeneath so that the check out clerk unloads the cart directly and can check the items out while doing so, placing the checked out merchandise on a counter area.

Such arrangements still involve the handling of the merchandise after it is checked out either by the check out clerk or another employee for the purpose of placing it into containers and this not only consumes time but also requires that a counter be a substantial size provided at the check out station so as to be able to hold all of the merchandise that might be encountered in any given order.

It has also been attempted to supply carts which unload automatically but, with the exception of the cart illustrated in my prior U.S. Pat. No. 3,083,791, automatic unloading of merchandise carts has not met with success due to mechanical failure or due to expensive, cumbersome, and unreliable equipment required in connection therewith.

Further, even in the case of automatic unloading of a cart in such a manner as to bring the merchandise within the easy reach of the check out clerk, it is still necessary to handle the merchandise after checking out in order to place it in containers.

In my issued U.S. Pat. No. 3,480,114, I disclose a device for supporting bags to receive merchandise with the bags being so located that they are within easy reach of the check out clerk so that as the check out clerk picks the merchandise up item by item and posts the price thereof in the cash register, the merchandise can be set down directly in the bags. When the order has been completed, or when the bags are filled, they can be discharged readily from the bag supporting device to a conveyor, or to a receiving cart, and the check out clerk can then place other bags in the bag supporting device and proceed with further checking out operations.

Such a bag supporting device, when employed with an automatic unloading cart of the type illustrated in the above mentioned U.S. Pat. No. 3,083,791, results in a considerable reduction in the size of a check out station by greatly reducing counter requirements and, likewise, greatly reduces the number of times the merchandise must be handled and eliminates the need for an extra employee to be available for placing the merchandise in containers after it has been checked out.

Further, a system of this nature permits the customer to monitor the check out clerk during the check out operation and thereby to assist in eliminating errors in the check out operation.

The present invention represents still further developments and refinements in check out systems of the nature illustrated in the aforementioned patents and, especially, in respect of carts for use with such systems.

A particular object of the present invention is the provision of a merchandise check out system and a cart for use therewith for retail establishments in which the minimum in space and equipment is required and which is highly efficient in utilizing the personnel of the retain establishment.

A further object of the present invention is the provision of a check out system and a cart for use therewith for a retail establishment in which the check out station is extremely compact and simple in construction, thereby representing an economy at the time of installation and, furthermore, being conserving of valuable space in the establishment.

A still further object of the invention is the provision of a single novel cart arrangement for both in store and out of store use.

A still further object of the invention is the provision of a novel cart for use with a check out system for a retail establishment which can be so constructed as to permit elimination of all elongated counter surfaces and moving conveyors from the check out station thereby providing for a high degree of simplicity and compactness and at the same time providing for greater speed and efficiency in the checking out operation.

These and other objects and advantages of the present invention will become more apparent upon reference to the following detailed description taken in connection with the accompanying drawings in which:

FIG. 2 is a perspective view of a cart with a tiltable basket;

FIG. 3 is a side view of the cart of FIG. 2;

FIG. 4 shows a check out system using the cart of FIGS. 2 and 3 for both in store and carry out purposes;

FIG. 5 is a fragmentary perspective view showing the latch for the cart of FIGS. 2 and 3;

FIG. 8 shows another type cart in perspective;

FIG. 9 shows the cart of FIG. 8 in tilted position;

FIG. 10 shows the cart of FIG. 9 in tilted position;

FIG. 11 shows still another type cart from the side with the basket in one tilted position;

BRIEF SUMMARY OF THE INVENTION:

The present invention proposes an improved merchandise check out system in which containers such as paper bags for receiving the merchandise are supported within easy reach of the check out clerk positioned before a cash register in the check out station and with the containers so supported and inclined that the items being handled by the check out clerk can be inserted directly into the containers by the clerk after being picked up during the checking out operation to ascertain the price and to separate the particular item from the remainder of the items being checked out.

The invention, furthermore, provides for the presenting of articles to be checked out to the check out clerk in such a manner that they need not be handled by the customer. This can be accomplished by the provision of an automatically unloading cart, or by the provision of a special cart so constructed as to permit the check out clerk readily to reach all items therein without moving from operative position to reach all items therein without moving from operative position before the cash register.

The supporting of the containers or bags in such position that the check out clerk can insert checked out items directly therein is accomplished by the provision of a special bag holding device or by the provision of a special cart construction in which the bags or containers are placed and which cart supports the bags at the proper angle of inclination and location with respect to the check out clerk.

In one advantageous modification of the invention, the check out station consists merely of a cash register support, a temporary holding tray for items that cannot be placed directly into the containers and, optionally, a scale supporting platform, and space for two special carts in end to end relation, and facing in the same direction, the one cart containing the merchandise to be checked out and the other cart supporting the containers or bags for receiving the merchandise.

In this case, the cart used in the store is identical with the one used to convey the containers out of the store, and, at the end of a checking outoperation, the now unloaded in store cart which the customer used to collect the merchandise is merely pushed, or drawn, through the frame which supports the holding tray or platform and becomes the cart in which the bags or containers are placed to receive the next order checked out.

The dimensions of the check out station in the last mentioned example are at a minimum and the inventory of carts is small because only one type of cart is required, while the operations which must be carried out by the check out clerk, other than the checking out operation, are minimal.

DETAILED DESCRIPTION OF THE INVENTION

Figure 1:
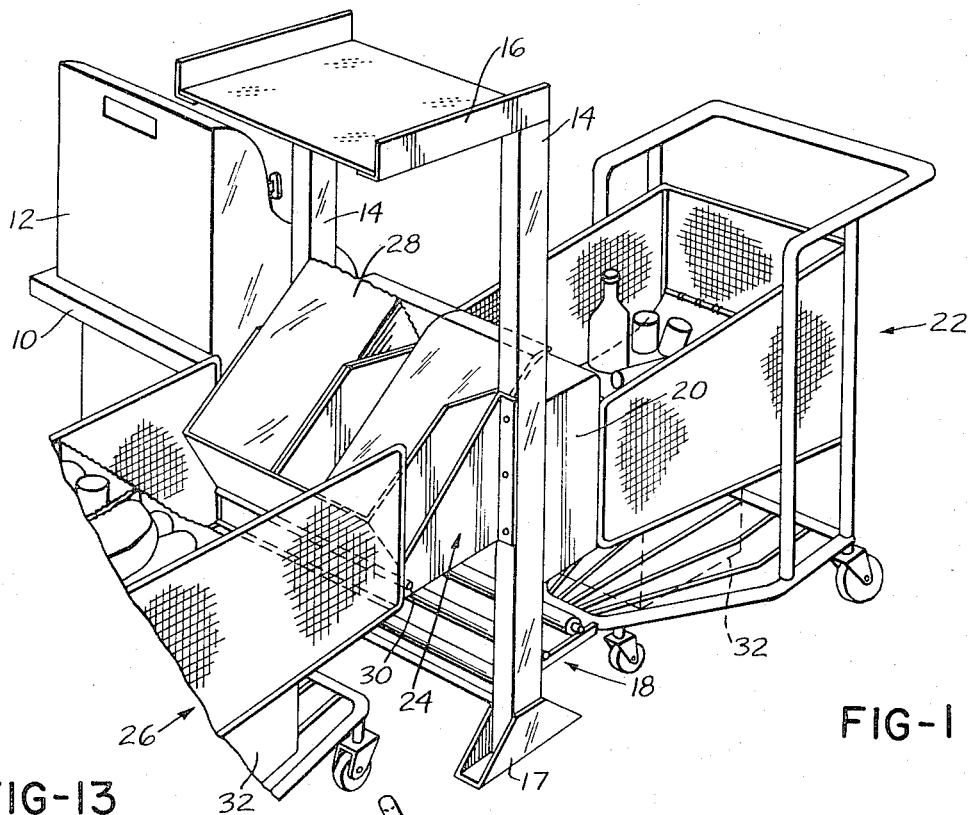
FIG. 1 is a perspective view showing one modification of a check out system according to the present invention.

FIG. 1 schematically illustrates one arrangement according to the present invention wherein the check out station consists of a table 10 supporting a cash register 12 and beside which table, or integral therewith, is a frame consisting of vertical side posts 14 with a platform 16 supported on the upper ends thereof. The posts terminate at the bottom in support feet 17, and extending laterally between the posts adjacent the bottom is a short section of a roller conveyor generally indicated at 18.

Mounted on the posts 14 on the side toward the cash register is a power unit 20 for operating the unloading mechanism of the automatic unloading cart generally indicated at 22 and which is constructed in accordance with the disclosure of my prior U.S. Pat. No. 3,083,791.

Also supported between posts 14 is a bag supporting device generally indicated at 24 and constructed in conformity with the disclosure in my prior U.S. Pat. No. 3,480,114. Presented to the device 24 from the side opposite the merchandise cart 22 is an out-of-store or carry out cart 26 which is open on the outer end so that it will receive the bagging device 24 between the side walls thereof.

The bagging device is adapted for supporting paper bags 28 so positioned and inclined that a check out clerk standing before the cash register 12 can place merchandise directly into the bags.

When the bags are loaded, or when an order is completely checked out, the bagging device is tilted about pivot axis 30 thereof and the bags are discharged into cart 26 and the device is then tilted back to the original position. If further bags are required for the same order, other empty bags can be pushed outwardly away from the bagging device a short distance and the further bags filled by the check out clerk can then be unloaded into the cart adjacent the first ones placed therein.

Large items of merchandise, exemplified by box 32 resting on the lower deck of cart 22, can be pushed to the lower deck of carry out cart 26 by availing of roller conveyor 18 thereby eliminating the difficulty of lifting bulky or heavy items while, at the same time, providing the advantage of checking out of the merchandise items one by one thereby reducing the possibility of making errors that might otherwise occur during the checking out operation.

A scale can be placed on platform 16, or a further platform can be provided for a scale. Platform 16, in any case, represents a convenient holding area for temporarily storing items that, for one reason or another, either cannot be checked out immediately or cannot be placed into the bags immediately.

For example, frozen products which require special bags can advantageously be placed on platform 16 after being checked out. Also, crushable items which would be placed on top of the contents of a bag, or placed in a separate bag, can be placed on the holding platform while the checking out of an order is complete.

In any case, it will be observed that the entire check out counter installation according to the FIG. 1 arrangement is extremely small and is thus conserving of valuable floor space while, at the same time, multiple handling of the merchandise is eliminated thereby eliminating, or, at least, greatly reducing, the need for extra employees at the check out region and greatly speeding up the entire check out operation.

Furthermore, as mentioned, the customer can monitor the checking out operation from beginning to end and thereby assist in eliminating errors in connection with the check out operation.

FIGS. 2 to 5 illustrate a modified form of cart and a check out system utilizing the cart having particular merit in respect of convenience and economy.

The cart illustrated in FIGS. 2 and 3 comprises a frame consisting of the "U" shaped frame part 90 at the bottom of the cart which has relatively large wheels 92 at the back and smaller caster mounted wheels 94 at the front. Frame 90 carries a lower deck member 96 pivotally connected at the front end at 98 to the frame and tiltable upwardly about the pivotal connection. Transverse bar 100, at the back of the lower deck, provides a stop for stopping the lower deck in the lower position in which it is illustrated in FIGS. 2 and 3.

The frame of the cart comprises the inverted "U" shaped frame parts 102 at the sides fixed to and upstanding from the rear end of "U" shaped frame part 90. Welded, or otherwise fixedly secured to the upper end of each frame part 102, is a plate 104, each of which carries a pivot 106 for basket 108 and each of which plates also has formed thereon a flange 110 concentric with pivot 106 and provided with spaced holes 112.

Basket 108 is open at the front at 114 and has a substantially conventional inwardly swingable back wall 116. The entire basket is pivotal about the pivots 106 so that it can be tilted from a substantially horizontal position upwardly to angles of about 22° from the horizontal, 45° to the horizontal, and about 60° to the horizontal.

The basket 108 on opposite sides thereof carries the tubular elements 118 slidably mounted therein are plungers 120 which, at their upper ends, are interconnected by transverse lock bar 122 positioned somewhat forwardly and downwardly relative to transverse handle 124 for the cart. Handle 124 is made rigid with the cart by fixedly securing opposite ends of the handle to the heavy wire frame 126 of the cart.

The lower end of tubular elements 114 may be secured to the brackets 128 fixed to opposite sides of the cart adjacent the arcuate flanges 110 of the respective plates 104.

FIG. 2 shows the basket 108 of the cart in its lower position whereas FIG. 3 shows the basket of the cart tilted up to about its 22 degree position and which is an advantageous position for the basket to occupy while it is used for in store operation. The basket could also occupy its horizontal position for in store operation if so desired.

FIG. 4 shows the manner in which the cart of FIGS. 2 and 3 could be utilized in arriving at the compact check out station. In FIG. 4, the check out station merely consists of the spaced upstanding frame members 130 having connected thereto a platform for supporting cash register 132 and advantageously having a convenience or holding platform 134 at the upper ends.

An in store cart, generally indicated at 136, is presented front end foremost to the check out station and may be held in place as by the ridges 138 on the floor which engage the rear wheels 92 of the cart but which are preferably spaced far enough apart to clear the closely spaced front wheels of the cart. The basket 108 of cart 136 is tilted to its 22° angle and this makes it convenient for the check out clerk to pick up the merchandise directly from cart 136.

The other cart shown in FIG. 4, indicated generally at 140, is the carry out cart and is presented rear end foremost to the check out station and with the basket 108 thereof tilted to either the 45° position or the 60° position thereof. Basket 108 of the carry out cart can have one or more bags 142 placed therein which will be supported in tilted position so that the clerk can place the merchandise directly into the bag. Cart 140 is also preferably retained in position by ridges 144 on the floor which engage the back wheels 92 of the cart but which are laterally spaced a greater distance than front wheels 94 of the cart.

When an order has been completely checked out, the basket of cart 140 can be tilted downwardly to its 22° position, or to its lower position, when the cart is utilized as a carry out cart. The now empty cart 136 is pushed by the check out clerk to carry out position and the basket is tilted upwardly to the angle desired by the check out clerk and becomes the carry out cart for the next order to be checked out.

Any large items resting on the lower deck 96 of the in store cart can be transferred directly to the lower deck 96 of the carry out cart at the end of the checking out operation merely by lowering basket 108 of carry out cart 140 in its carry out position and by tilting basket 108 of the in store cart 136 upwardly which will make the articles on the lower deck of the in store cart readily accessible to the check out clerk.

It will be noted, particularly in FIG. 4, that the handle 124 of the cart in receiving or, outgoing, position is located below the lower end of the cart in incoming position so that no interference is offered by the handle to the transfer of merchandise from the incoming cart into the containers or containers, carried in the outgoing cart.

Figure 6:
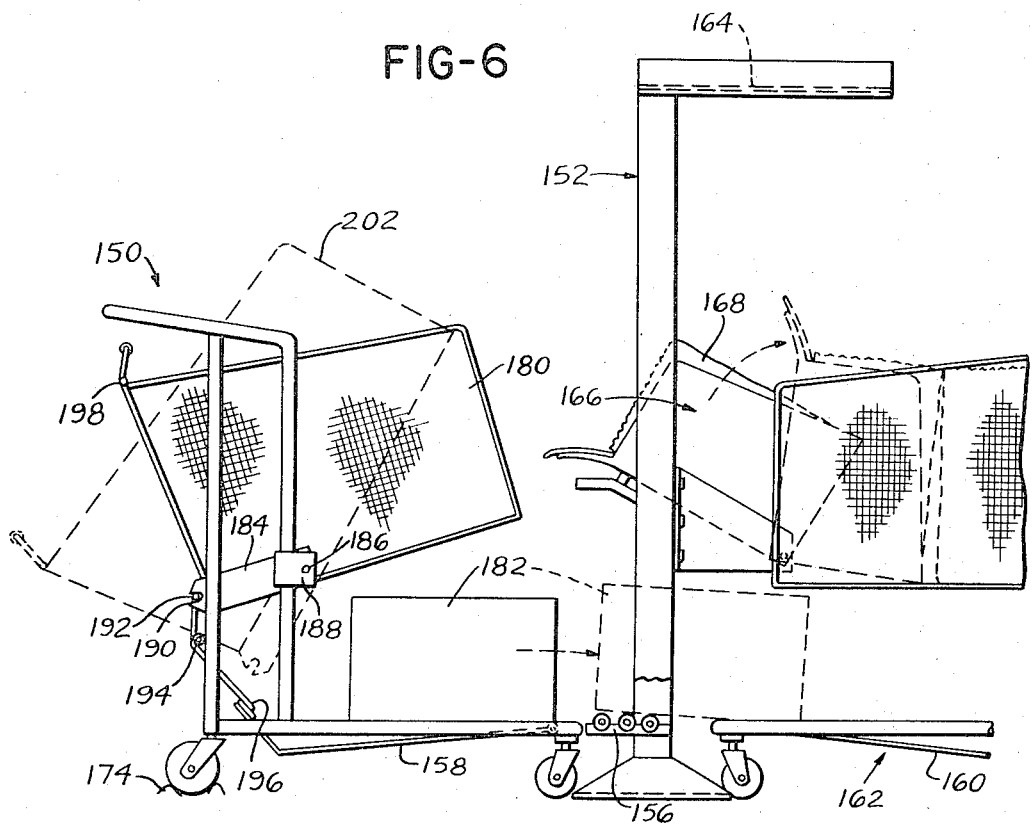
FIG. 6 shows still another check out system of the present invention.

FIG. 6 shows a modified arrangement of a check out station according to the present invention wherein an incoming cart 150 is presented front end foremost to the open frame 152 forming a part of the check out station and at the side of which is disposed the cash register 154 before which the check out clerk stands. Frame 152 comprises laterally spaced legs having a conveyor means, such as a roller conveyor 156 carried between the legs thereof at about the level of lower deck 158 of the incoming cart 150 and of lower deck 160 of outgoing cart 162. The legs of frame 152 may at the top carry a shelf 164, which advantageously, may consist of a sheet of transparent plastic material.

Cart 162, which is identical with cart 150, is presented front end foremost toward frame 152 and is adapted to receive, in the open end of the basket, a tiltable support frame 166 which is adapted to support one or more merchandise receiving containers such as bag 168. When support frame 166 is tilted about its pivotal support 170, the container, or containers, therein will be discharged into the basket 172 of cart 162. The floor may be provided with ridges 174 to locate cart 162 and ridges 176 to locate cart 150. Optionally, a second set of ridges 178 may be provided for cart 162 to hold it in a second operative position after one set of containers has been discharged therein from support frame 166.

In the arrangement illustrated in FIG. 6, merchandise is picked up from the basket 180 of incoming cart 150, the price thereof is posted in the cash register, and the merchandise then placed directly in container 168.

Large articles of merchandise, as shown in 182, at the lower deck of cart 150 can be moved directly across conveyor 156 to the lower deck of cart 162.

The carts 150 and 162 in FIG. 6 are identical and each basket has fixed thereto a latch plate 184 and is pivoted by pivot means 186 to a bracket plate 188 fixed to the frame of the cart. Each latch plate 184 has a notch 190 in the rear end adapted for receiving the ends 192 of a latch frame which is pivoted to the frame of the cart on the center line of a transverse bar 194. The lower end of the latch frame, at 196, is so disposed relative to the inclined rear end of the tiltable lower deck of the cart that when the lower deck is moved upwardly at the back, ends 192 will be withdrawn from notches 190 and permit the basket to drop to its lower position. In its lower position, the basket is stopped by the abutment elements 198 on the basket which engage beneath the handle portion 200 of the cart.

As will be seen in FIG. 6, the basket 180 of incoming cart 150 is tiltable upwardly to the dashed line position shown at 202 to permit the article 182 on the lower deck of the incoming cart to be moved across conveyor 156 to the lower deck of outgoing cart 162.

Figure 7:
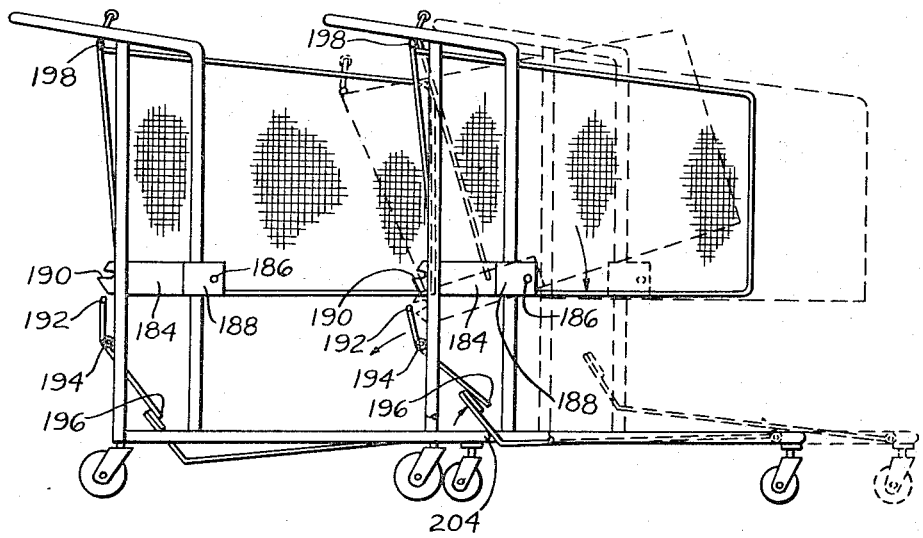
FIG. 7 shows the cart of FIG. 6 in nested relation.

As will be seen in FIG. 7, the carts are adapted to nest with the baskets thereof in lowered position and when two carts are brought into telescopic engagement the front end 204 of the frame of the rearmost cart will tilt up the lower deck of the foremost cart and release the basket thereof, if in tilted position, so that it will drop to its lowered position and permit complete telescoping of the carts.

The cart of FIGS. 6 and 7 is subject to modification to adapt it to various uses. This is illustrated in FIGS. 8, 9 and 10 in which a cart is shown having a basket open at the front and top and closed on the other sides and which is dimensioned substantially wider than conventional merchandise carts. The basket of the cart of FIGS. 8 to 10 is adapted for conveying luggage, and for use as an invalid chair, or the like, in airports and similar places. The cart in FIG. 8 has a frame 210 with a lower deck 212 resting on the frame 210 in the lower region of the cart and tiltable upwardly at the back end.

The cart has a basket 214 in the upper portion of the frame and which, toward the back, carries a latch plate 216 pivoted at 218 to a pivot bracket 220 fixed to the cart frame. Each latch plate 216 has a rear notch 222 engageable with a latch bar 224 which is pivoted on transverse rod 226 carried on the cart frame. The basket 214 will be stopped in its lower position by the abutment means 228 on the basket which engages the underside of handle 230 and can be supported in tilted position, as shown in FIG. 9, by availing of latch plates 216 and latch bar 224.

The basket 214 of the cart of FIGS. 8 to 10 tapers inwardly from top to bottom and is adapted for being pivoted upwardly to a vertical position as shown in FIG. 10 and nested with other carts. When pivoted to its uppermost position, and which is a stable position, the back end of the basket 214 will engage the pivot members 232 for rod 226 and thereby be supported in vertical position. The front end of each frame will tilt up the lower deck of the next preceding cart frame thereby to permit the telescoping of the carts as illustrated in FIG. 10.

The present invention is also concerned with a check out system utilizing still another cart of special design having particular merit in respect of merchandise check out systems and which is shown in FIGS. 11 to 14. The cart will be seen to comprise large rear wheels 300 and smaller front wheels 302 with the front wheels mounted on caster supports 304. The cart is provided with a tubular frame consisting of the lowermost horizontal portion 306, which is "U" shaped, closed at the front and tapering inwardly toward the front and open toward the rear of the cart, and with vertical tubular members 308 and 310 extending upwardly from near the rear end of frame part 306.

At their upper ends, frame members 308 and 310 are interconnected and are fixed to an upwardly and rearwardly extending handle portion 312. The tubular members 308 and 310 and tubular frame 306 are welded together and form a substantially rigid frame work for the cart.

Extending between and fixed to members 308 and 310 on opposite sides of the cart are plates 314 which near the front lower corners thereof have pivots 316 for pivotally supporting a basket structure generally identified at 318. The basket has plates 315 fixed thereto on opposite sides adjacent plates 314 and pivots 316 pivotally connect each plate 315 and the adjacent plate 314 for tilting of the basket.

Figure 12:
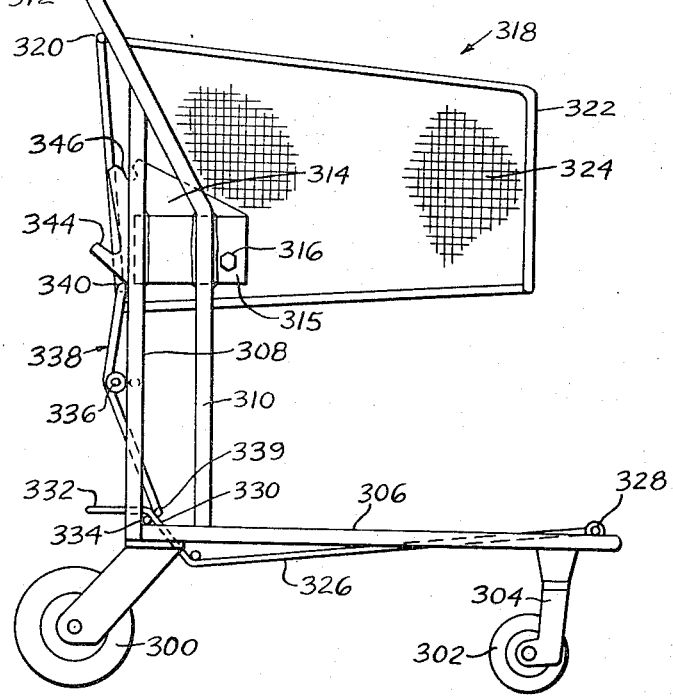
FIG. 12 shows the cart of FIG. 11 with the basket in lowered position.

The basket structure is shown in FIG. 12 in its lowermost position and is stopped in this position by any suitable abutment means such as the rod means 320 toward the back of the basket at the top which engages under the underside of the handle structure of the vehicle.

Other abutment means could, of course, be provided for stopping the basket in its FIG. 12 position. It will be noted that the basket, when in its lowered, or FIG. 12 position may incline somewhat upwardly on the bottom and downwardly on the top toward the front of the cart. The basket is provided with a substantial frame member 322 extending along the top edges and down the side edges at the front and across the bottom at the front and either integral with or welded to the rod means 320 extending across the basket at the top.

The basket is completed by the vertical and generally horizontal wires 324 which are arranged and formed in a substantially conventional manner and connected to frame member 322.

The cart has a lower deck 326 preferably formed by longitudinally extending rods interconnected at the front and back ends and pivotally supported at 328 near the front of the cart so that the back end of the lower deck can be moved up and down. Toward the rear end of the lower deck 326 there is an upwardly and rearwardly inclined portion 330 terminating in a rearwardly extending part 332 which is accessible from the rear of the cart.

A transverse rod 334 forming a part of the lower deck provides a stop therefor in the lowest position of the deck by engaging frame part 306. The deck can be elevated by lifting the projecting portion 332 with the toe or by hand.

Further, when the carts are nested, the front end of frame part 306 of the rear one of a pair of nested carts will engage inclined portion 330 of the lower deck of the front one of the pair of carts and elevate deck 326 of the front cart.

Pivotally mounted on the back of upright members 308, as by the pivots 336, is a latch frame 338. The lower end of the latch frame at 339 is so disposed relative to the upwardly inclined portion 330 of lower deck 326 that when deck 326 is pivoted upwardly about its pivotal support 328, latch frame 338 is pivoted about its pivot 336 in the counterclockwise direction as it is viewed in FIGS. 11 and 12.

Latch frame 338 preferably comprises side portions at the sides of the cart with transversely extending top and bottom bar members 339 and 340, respectively. The lower bar member 339 is engaged by the upwardly inclined portion 330 of lower deck 326 while the upper bar member 340 cooperates with notches formed in the back edges of the plates 314. The space between the upper bar member 340 of latch frame 338 and the lower transverse bar member 339 thereof is open so that articles of merchandise can be passed therethrough to lower deck 326 for a purpose to become more apparent hereinafter.

The cart is shown with the basket tilted up at an angle of about 22° in FIG. 11. This tilting of the basket can readily be accomplished by lifting of the front end of the basket and the basket is retained in its tilted position by engagement of the upper transverse bar member 340 of the latch frame with the lower notches 344 in the back edges of plates 314. These notches are so disposed that, once the bar member 340 is engaged therewith, the basket will be locked in its tilted position and cannot be tilted in either direction until bar member 340 is withdrawn from notches 344.

Thus, the basket at its 22° tilted position will not be released therefrom except by the deliberate act of moving the upper end of latch frame 338 in the backward direction. The cart in its 22° position can be employed for collecting merchandise to be checked out or, if the merchandise is collected in the cart while the cart basket is in its lower position, the check out clerk will lift the basket to its 22° position before commencing to check out an order. Since the basket is open at its front end, it is preferable for it to be in its 22° position for the collecting of merchandise by the customer.

Figure 13:
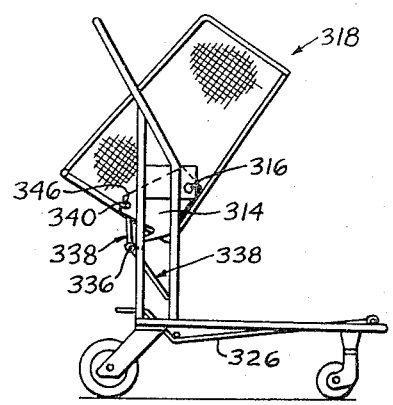
FIG. 13 shows the FIG. 11 cart with the basket tilted upwardly.

FIG. 13 shows the cart with the basket tilted upwardly to an angle of about 50° to 60°. When the basket is tilted to this angle, transverse bar member 340 at the upper end of latch frame 338 engages upper notches 346 in the back edges of plates 314. These notches are also formed so that once the bar member 340 is engaged therewith, tilting of the basket in either direction can only be accomplished by first deliberately removing bar member 340 from notches 346.

As will be seen hereinafter, the cart basket is tilted to its FIG. 13 position for supporting bags during a checking out operation and may remain in this position during a carry out operation, or may be lowered to its FIG. 11, or even to its FIG. 12 position, for carry out operations.

Figure 14:
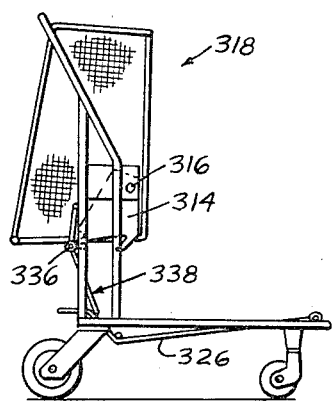
FIG. 14 shows the FIG. 11 cart with the basket in the highest position thereof.

FIG. 14 shows a still further position which the basket of the cart of FIGS. 11 and 12 can occupy and wherein the basket is tilted up to a substantially vertical position. In this position of the basket, and which is a stable position, but not a latched position, the carts can be nested. The cart basket, in the FIG. 14 position thereof, can stop against the pivot members 336 of the latch frame 338. For nesting of the carts, the baskets 318 taper inwardly toward the bottom so that the bottom of one basket is readily receivable into the top of an adjacent basket.

In one manner of using the cart of FIGS. 11 to 14, a first cart, of the type mentioned, is presented front end foremost to a check out station on the incoming side and a second cart of the type mentioned is presented front end foremost at the outgoing side of the check out station. The check out station is disposed between the carts and includes a bagging device. The incoming cart is tilted upwardly at an angle of 22° and the outgoing cart is positioned with the basket in its lower position.

Either one or both of the carts may be provided with holding devices in the nature of protrusions on the floor which engage opposite sides of at least one of the larger rear wheels of the cart while being disposed at such a distance apart that the more closely positioned front wheel of the cart will pass therebetween.

The check out station may comprise a short section of roller conveyor across which articles of merchandise of substantial size can be moved from the lower deck of incoming cart to the lower deck of outgoing cart.

A particularly advantageous installation results wherein the check out station is constructed with the side posts thereof spaced apart a sufficient distance to permit carts of the type illustrated in FIGS. 11 to 14 to pass directly therethrough. With this arrangement, it becomes possible to carry out a checking operation by presenting a merchandise cart in which an order has been collected by a customer, front end foremost, in the incoming position in the check out station and with the basket tilted up to the 22° position.

The outgoing cart is located directly in front of incoming cart and faces in the same direction as the incoming cart but has the basket thereof tilted upwardly to its 50° to 60° position. With carts thus positioned, bags can be placed in the outgoing cart and will be supported in inclined position with the open ends toward the check out clerk standing in check out position before the cash register so that the check out clerk can pick the merchandise up item by item from incoming cart, post the price thereof in the cash register, and then place the merchandise directly in one of the bags in outgoing cart.

The handle of the outgoing cart is at an elevated position in the described arrangement and does not interfere in any way with the operation of filling the bags in the outgoing cart or the removing of items of merchandise from the incoming cart.

When an order has been completely checked out and transferred to the containers in outgoing cart, including any articles on the lower deck thereof, the basket can easily be lowered either to its 22° position or its horizontal position and pushed away from the check out station and the customer, or a special employee, can then use the outgoing cart to convey the merchandise to a waiting vehicle.

The now empty incoming cart is now merely pushed through the check out station to the outgoing position and tilted upwardly to its 50° to 60 position and can now be used as the outgoing cart for the next order to be checked out. The latch lever 338 is within easy reach of the check out clerk so that the operation of tilting the basket upwardly and downwardly involves no particular effort or inconvenience or lost time to the check out clerk.

The use of the special cart thus results in an extremely compact check out station in that all counter areas for incoming and outgoing merchandise are eliminated, other than the elevated holding platform; no motorized conveyors or other devices are required; and only one type of cart is required for both in store and out of store use. The dimensions of the check out station are extremely small as compared to conventional check out installations and valuable floor space is thus conserved.

The advantage is also had, as has been referred to before, that the customer can monitor the checking out operations thereby assisting in keeping errors in this operation at a minimum.

Modifications may be made within the scope of the appended claims.

What is claimed is:

1. In a cart; a wheeled support frame, a basket in the frame open on top and at the front and closed on the other sides, pivot means near the rear of the basket toward the bottom thereof connecting the basket to the frame for tilting of the basket in the frame, stop means on the frame to stop the basket in a lower position in the frame, cooperating elements of latch means on the basket and frame for latching the basket in at least one upwardly tilted position of the basket in the frame said frame including a lower deck beneath said basket pivoted at the front end to the frame so as to be vertically movable at the other end, and means operated by upward movement of the rear end of said deck for effecting disengagement of said elements of latch means.

2. A cart according to claim 1 in which said lower deck inclines downwardly toward the rear and at the rear end has an upwardly inclined region, the frame of a second cart nesting with said cart from the rear engaging said upwardly inclined region of said lower deck and lifting said lower deck to latch means disengaging position.

3. In a cart; a wheeled support frame, a basket in the frame open on top and at the front and closed on the other sides, pivot means near the rear of the basket toward the bottom thereof connecting the basket to the frame for tilting of the basket in the frame, stop means on the frame to stop the basket in a lower position in the frame, cooperating elements of latch means on the basket and frame for latching the basket in at least one upwardly tilted position of the basket in the frame, the element of latch means on said basket comprising plate means fixed to the sides thereof and having notched rear edges at the rear end of the basket, said element of latch means on said frame comprising a bar extending laterally of said basket at the rear thereof, and means below said bar forming a transverse pivot axis tiltably connecting said bar to said frame.

4. A cart according to claim 3 which includes means on said bar below said pivot axis for tilting said bar about said axis, a lower deck on said cart pivoted at the front end to said cart and engageable with said means on said bar to unlatch said latch means upon tilting of said lower deck.

5. In a cart; a wheeled support frame, a basket in the frame open on top and at the front and closed on the other sides, pivot means near the rear of the basket toward the bottom thereof connecting the basket to the frame for tilting of the basket in the frame, stop means on the frame to stop the basket in a lower position in the frame, cooperating elements of latch means on the basket and frame for latching the basket in at least one upwardly tilted position of the basket in the frame, said element of a latch means on said frame comprising a plate on the frame having a curved flange coaxial with the axis on which the basket is pivoted to the frame and facing the upper rear corner of the basket, a handle on the basket at the upper rear corner thereof, a plunger on the basket having one end near said flange and the other end near said handle, holes in the flange to receive the said one end of the plunger, and a rod parallel to said handle and adjacent thereto and connected to said plunger and movable toward said handle to disengage said plunger from said flange.

* * * * *